United States Patent
Tanno (10) Patent No.: US 10,639,943 B2
(45) Date of Patent: May 5, 2020

(54) PNEUMATIC TIRE

(71) Applicant: The Yokohama Rubber Co., Ltd., Minato-ku, Tokyo (JP)

(72) Inventor: Atsushi Tanno, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 214 days.

(21) Appl. No.: 15/547,480

(22) PCT Filed: Jan. 5, 2016

(86) PCT No.: PCT/JP2016/050160
§ 371 (c)(1),
(2) Date: Jul. 28, 2017

(87) PCT Pub. No.: WO2016/121421
PCT Pub. Date: Aug. 4, 2016

(65) Prior Publication Data
US 2018/0001717 A1 Jan. 4, 2018

(30) Foreign Application Priority Data
Jan. 29, 2015 (JP) .................... 2015-015623

(51) Int. Cl.
*B60C 19/00* (2006.01)
*B60C 5/00* (2006.01)

(52) U.S. Cl.
CPC .............. *B60C 19/002* (2013.01); *B60C 5/00* (2013.01)

(58) Field of Classification Search
CPC ........ B60C 19/002; B60C 5/00; B60C 99/003; B60C 5/002; B60C 17/04; B60C 19/001
See application file for complete search history.

(56) References Cited

U.S. PATENT DOCUMENTS

| | | | |
|---|---|---|---|
| 9,446,633 B2 * | 9/2016 | Benoit | B60C 19/002 |
| 2005/0098251 A1 | 5/2005 | Yukawa | |
| 2006/0231185 A1 | 10/2006 | Tanno | |
| 2011/0308677 A1 * | 12/2011 | Kamprath | B60C 19/002 152/155 |
| 2013/0037194 A1 * | 2/2013 | Hino | B60C 23/18 152/517 |

(Continued)

FOREIGN PATENT DOCUMENTS

| | | |
|---|---|---|
| CN | 1829612 | 9/2006 |
| JP | 2002-067608 | 3/2002 |

(Continued)

OTHER PUBLICATIONS

List of Thermal Conductivity, Wikipedia, Oct. 30, 2014 (Year: 2014).*

(Continued)

*Primary Examiner* — Robert C Dye
*Assistant Examiner* — Farah Taufiq
(74) *Attorney, Agent, or Firm* — Thorpe North & Western (57) ABSTRACT

Provided is a pneumatic tire with a tread portion, a sidewall portion, a bead portion, and a sound absorbing member bonded to the tire inner surface. A sheet-like heat transfer member is provided between the tire inner surface and the sound absorbing member to extend outward from the region where the sound absorbing member is bonded, which forms a heat dissipation part projecting from the sound absorbing member in the heat transfer member.

18 Claims, 7 Drawing Sheets

(56) References Cited

U.S. PATENT DOCUMENTS

2013/0048181 A1     2/2013  Benoit
2017/0253091 A1*    9/2017  Kon .......................... B60C 5/01

FOREIGN PATENT DOCUMENTS

| JP | 2005-138760      | 6/2005  |
| JP | 2008-174080      | 7/2008  |
| JP | 2008174080 A *   | 7/2008  |
| JP | 2009-034924      | 2/2009  |
| JP | 2011-526556      | 10/2011 |
| JP | 2013-525203      | 6/2013  |
| WO | WO 2005/012007   | 2/2005  |
| WO | WO 2010/000789   | 1/2010  |
| WO | WO 2011/138282   | 11/2011 |

OTHER PUBLICATIONS

International Search Report for International Application No. PCT/JP2016/050160 dated Mar. 8, 2016, 4 pages, Japan.

* cited by examiner

PNEUMATIC TIRE

TECHNICAL FIELD

The present technology relates to a pneumatic tire with a sound absorbing member bonded to a tire inner surface, and more particularly relates to a pneumatic tire capable of improving high-speed durability.

BACKGROUND ART

One of the causes of the noises generated by a pneumatic tire is cavernous resonance resulting from vibration of the air with which the tire is filled. When a tire is rolled, uneven road surfaces cause a tread portion to vibrate. The vibrations of the tread portion cause the air inside the tire to vibrate, which produces this cavernous resonance.

As a method for reducing noise caused by such cavernous resonance, providing a sound absorbing member within a cavity portion formed between the tire and the rim of the wheel has been proposed. More specifically, a band-like sound absorbing member is bonded to a region of the tire inner surface corresponding to the tread portion (for example, see Japanese Unexamined Patent Application Publication Nos. 2002-67608A or 2005-138760A).

However, with a configuration in which the sound absorbing member is bonded to the tire inner surface in order to reduce cavernous resonance, when the heat generated in the pneumatic tire is increased due to high-speed traveling, heat dissipation from the tread portion into the tire cavity is impeded by the thermal insulation effect of the sound absorbing member, so heat tends to accumulate in the tread portion. Such an increase in the temperature of the pneumatic tire causes a problem that high-speed durability is deteriorated.

SUMMARY

The present technology provides a pneumatic tire whose high-speed durability can be improved even with a sound absorbing member bonded to the tire inner surface.

A pneumatic tire according to the present technology is provided with an annular tread portion that extends in the tire circumferential direction, a pair of sidewall portions disposed on both sides of the tread portion, and a pair of bead portions disposed on the inner sides in the tire radial direction of the sidewall portions, and sound absorbing member bonded to the tire inner surface. A sheet-like heat transfer member is provided between the tire inner surface and the sound absorbing member to extend outward from the region where the sound absorbing member is bonded, so that a heat dissipation part projecting from the sound absorbing member is formed in the sound absorbing member.

According to the present technology, in a pneumatic tire having a sound absorbing member bonded to the tire inner surface in the region corresponding to the tread portion, the sheet-like heat transfer member is provided between the tire inner surface and the sound absorbing member to extend outward from the region where the sound absorbing member is bonded, so that a heat dissipation part projecting from the sound absorbing member is formed in the heat transfer member. Therefore, the heat generated in the pneumatic tire during high speed travel is transferred to the heat transfer member and radiated to the tire cavity via the heat dissipation part. Therefore, even though the sound absorbing member is bonded to the tire inner surface, the high-speed durability of the pneumatic tire can be improved.

According to the present technology, preferably the sound absorbing member extends along the tire circumferential direction, and a length in a tire width direction of each heat dissipation part of the heat transfer member is from 5% to 50% of a width of the sound absorbing member. This configuration allows the heat to be effectively dissipated via the heat dissipation part.

Preferably, the heat transfer member includes a heat conductive material with a thermal conductivity not less than 10 W/(m·K). The heat transfer member including such a heat conductive material can provide a good heat dissipation effect.

Preferably the heat transfer member is a laminate that includes metal foil and resin layers. The metal foil has an excellent thermal conductivity, but the metal foil, when singly used, may rupture or peel as a result of the tire traveling. However, with the heat transfer member composed of a laminate of the metal foil and the resin layers, the adhesion of the heat transfer member can be improved due to the resin layers having excellent adhesion, and rupture of the metal foil can be prevented while a good thermal conductivity is maintained.

Preferably a thickness of the heat transfer member is from 30 μm to 150 μm. As described above, the heat transfer member having a sufficient thickness allows the heat dissipation to be secured, and setting an upper limit value to the thickness of the heat transfer member allows durability with respect to out-of-plane bending stress to be secured.

Preferably, a cut is provided in the heat transfer member at least at an end of the heat dissipation part. When the elasticity of the heat transfer member is low, the heat transfer member is unable to follow the deformation of the tire and thus easily peels from the tire inner surface. However, the cut provided at an end of the heat dissipation part of the heat transfer member allows the heat transfer member to easily follow the deformation of the tire, which can improve the adhesion to the tire inner surface.

Preferably, the heat transfer member has a three-dimensional structure at least at an end of the heat dissipation part. The heat dissipation part of the heat transfer member having a three-dimensional structure can further increase the heat dissipation effect therefrom.

Preferably the sound absorbing member has a through hole or a notch in a region directly above the heat transfer member. The through hole or the notch provided in the sound absorbing member in a region directly above the heat transfer member as described above can increase the heat dissipation effect of the heat transfer member, without substantially reducing the sound absorbing effect of the sound absorbing member.

DETAILED DESCRIPTION

Figure 1:
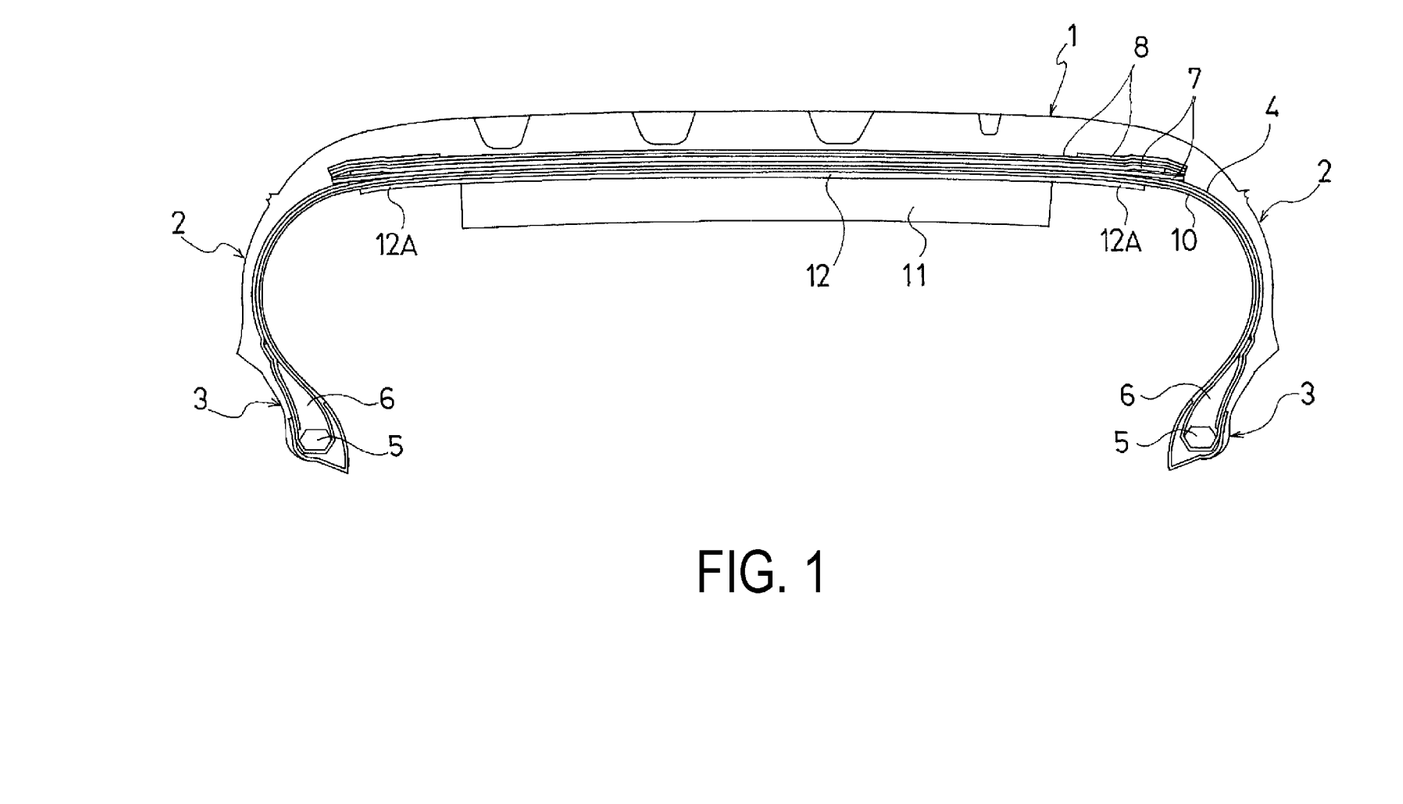
FIG. 1 is a meridian cross-sectional view illustrating a pneumatic tire according to an embodiment of the present technology.
Figure 2:
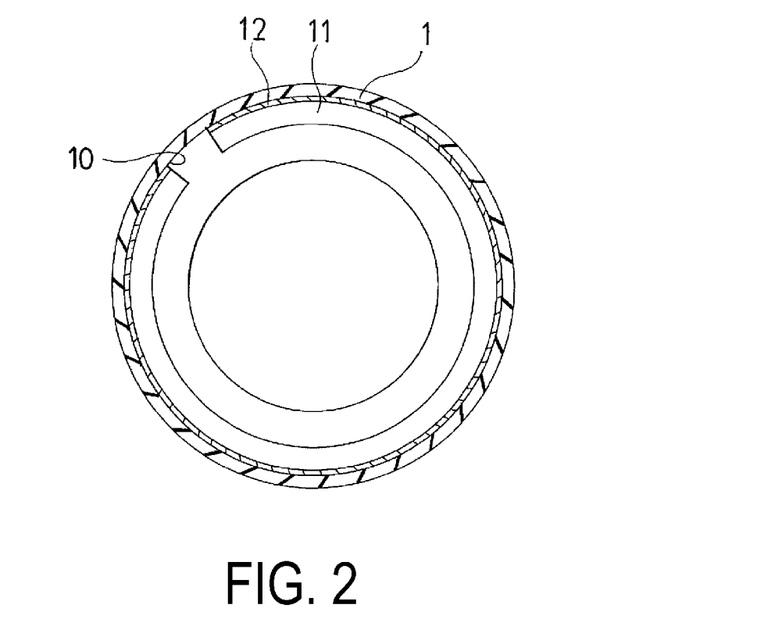
FIG. 2 is an equatorial cross-sectional view illustrating the pneumatic tire according to the embodiment of the present technology.
Figure 3:
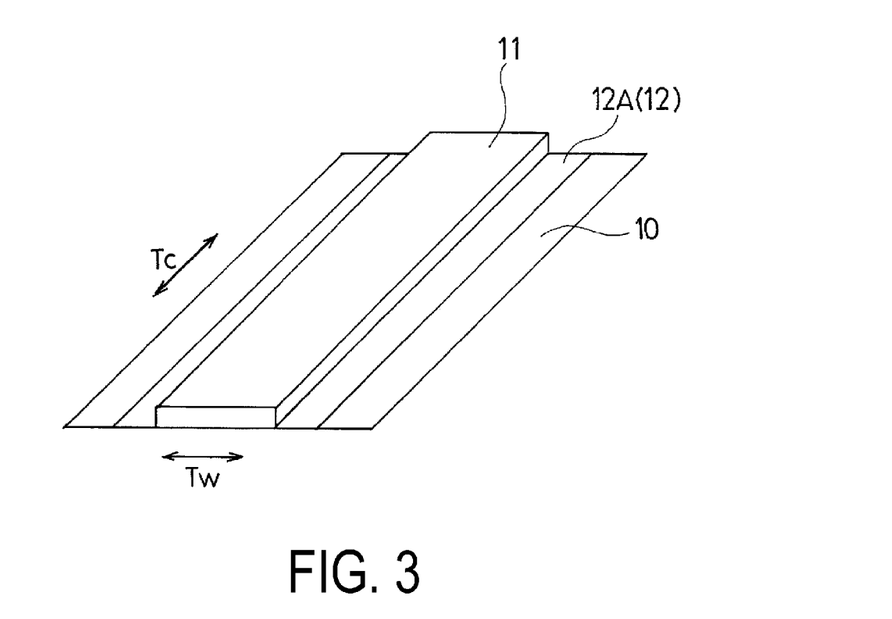
FIG. 3 is a perspective view illustrating a sound absorbing member and heat transfer member bonded to the inner surface of the pneumatic tire according to the present technology.
Figure 4:
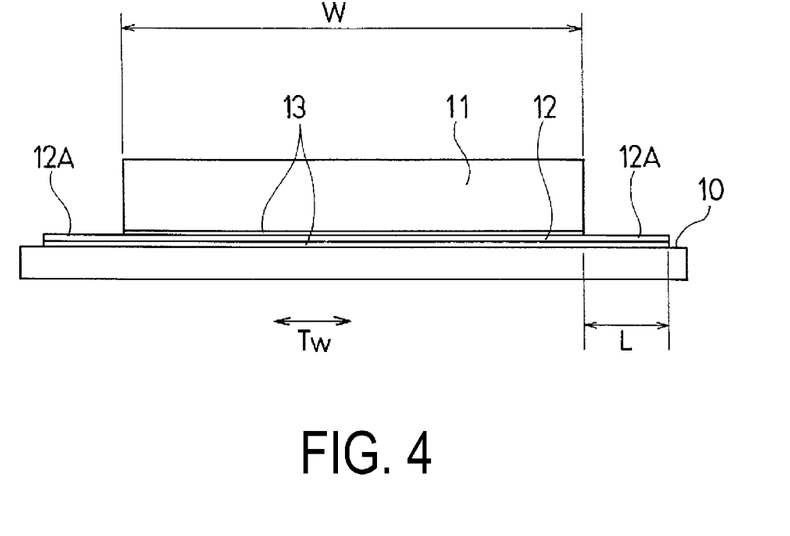
FIG. 4 is a cross-sectional view illustrating the sound absorbing member and heat transfer member bonded to the inner surface of the pneumatic tire according to the present technology.
Figure 5:
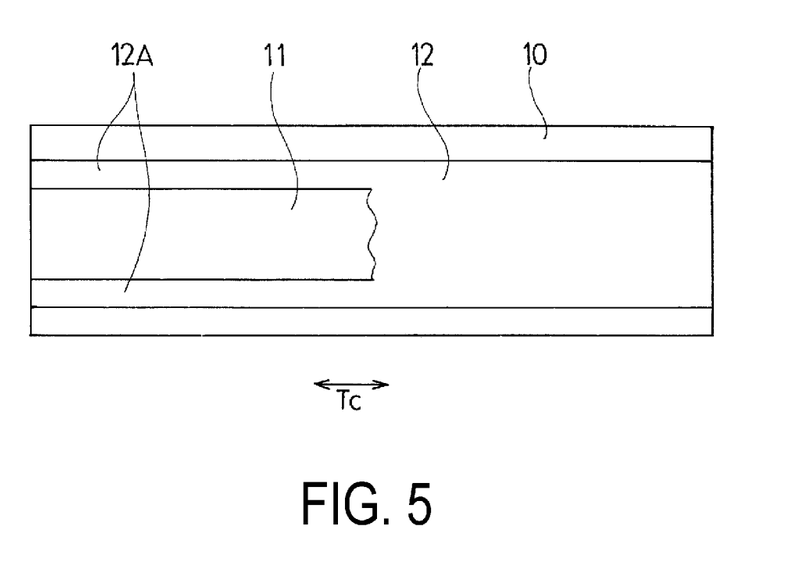
FIG. 5 is a developed view illustrating the sound absorbing member and heat transfer member bonded to the inner surface of the pneumatic tire according to the present technology.

A configuration of the present technology will be described below in detail with reference to the accompanying drawings. FIGS. 1 and 2 illustrate a pneumatic tire according to an embodiment of the present technology. FIGS. 3 to 5 illustrate a sound absorbing member and heat transfer member bonded to the tire inner surface. In FIG. 3, Tc denotes a tire circumferential direction, and Tw denotes a tire width direction.

As illustrated in FIGS. 1 and 2, the pneumatic tire of the present embodiment is provided with an annular tread portion 1 extending in a tire circumferential direction, a pair of sidewall portions 2 disposed on both sides of the tread portion 1, and a pair of bead portions 3 disposed on inner sides in a tire radial direction of the sidewall portions 2.

A carcass layer 4 is disposed extending between the pair of bead portions 3, 3. The carcass layer 4 includes a plurality of reinforcing cords extending in the tire radial direction, and is folded back around a bead core 5 disposed in each of the bead portions 3 from a tire inner side to a tire outer side. A bead filler 6 composed of a rubber composition having a triangular cross-sectional shape is disposed on a periphery of the bead core 5.

Meanwhile, a plurality of belt layers 7 are embedded on an outer circumferential side of the carcass layer 4 in the tread portion 1. These belt layers 7 include a plurality of reinforcing cords that incline with respect to the tire circumferential direction, and the directions of the reinforcing cords of the different layers intersect each other. In the belt layers 7, the inclination angle of the reinforcing cords with respect to the tire circumferential direction is set in a range from, for example, 10° to 40°. Steel cords are preferably used as the reinforcing cords of the belt layers 7. For the purpose of enhancing high-speed durability, at least one layer of a belt cover layer 8 is disposed on an outer circumferential side of the belt layers 7. The belt cover layer 8 is composed of reinforcing cords arranged at an angle of, for example, not greater than 5° with respect to the tire circumferential direction. Nylon, aramid, or similar organic fiber cords are preferably used as the reinforcing cords of the belt cover layer 8.

Note that the tire internal structure described above is exemplary of the internal structure of a pneumatic tire, but the internal structure of a pneumatic tire is not limited thereto.

In the pneumatic tire described above, a band-like sound absorbing member 11 is bonded, along the tire circumferential direction, to the tire inner surface 10 in the region corresponding to the tread portion 1, as illustrated in FIGS. 1 to 5. The bonding region of the sound absorbing member 11 is a whole surface region of the sound absorbing member 11 that comes into contact with the tire inner surface 10. The sound absorbing member 11 is composed of a porous material having open cells, and has predetermined noise absorbing properties based on the porous structure. Polyurethane foam may be used as the porous material of the sound absorbing member 11.

A sheet-like heat transfer member 12 is provided between the tire inner surface 10 and the sound absorbing member 11. The heat transfer member 12 is disposed to extend outward from the region in which the sound absorbing member 11 is bonded, which forms a heat dissipation part 12A, projecting from the sound absorbing member 11, in the heat transfer member 12. As illustrated in FIG. 4, an adhesive layer 13 is inserted between the tire inner surface 10 and the heat transfer member 12 and between the heat transfer member 12 and the sound absorbing member 11, and the two are bonded together via the adhesive layer 13. Adhesive in paste form or double-sided adhesive tape can be used as the adhesive layer 13, and in particular, double-sided adhesive tape is preferable. Also, the heat transfer member 12 may be fixed to the tire inner surface 10 by vulcanization bonding. In this case, preferably, the surface of the heat transfer member 12 on the tire side is composed of a resin layer that can be easily vulcanization bonded (for example, a nylon resin layer). For vulcanization bonding, the heat transfer member 12 may be laid onto the green tire in the tire molding step, and the green tire that includes the heat transfer member 12 is vulcanized.

In the pneumatic tire described above, when bonding the sound absorbing member 11 to the tire inner surface 10 in the region corresponding to the tread portion 1, the sheet-like heat transfer member 12 is provided between the tire inner surface 10 and the sound absorbing member 11 to extend outward from the region where the sound absorbing member 11 is bonded, which forms the heat dissipation part 12A, projecting from the sound absorbing member 11, in the heat transfer member 12. Therefore the heat generated in the tread portion 1 during high-speed travel is transferred to the heat transfer member 12 and dissipated to the tire cavity via the heat dissipation part 12A. Therefore, even though the sound absorbing member 11 is bonded to the tire inner surface 10 in the region corresponding to the tread portion 1, the accumulation of excessive heat in the tread portion 1 is prevented, enabling the high-speed durability of the pneumatic tire to be improved.

Note that there is no particular limitation on the position of the sound absorbing member 11 on the tire inner surface 10, but when the sound absorbing member 11 is bonded to the tire inner surface 10 in the region corresponding to the tread portion 1, and the sheet-like heat transfer member 12 is provided between the sound absorbing member 11 and the tire inner surface 10, the effect of significantly enhancing the high-speed durability can be obtained.

Figure 6:
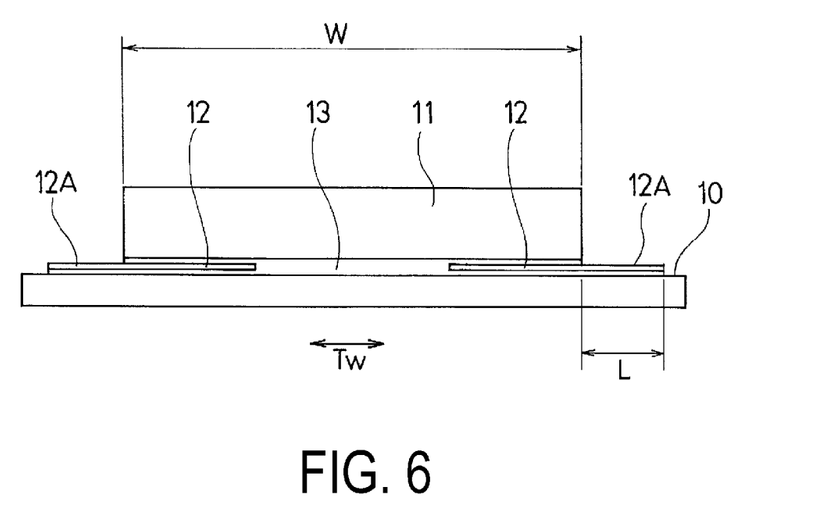
FIG. 6 is a cross-sectional view illustrating a modified example of the sound absorbing member and heat transfer member bonded to the inner surface of the pneumatic tire according to the present technology.
Figure 7:
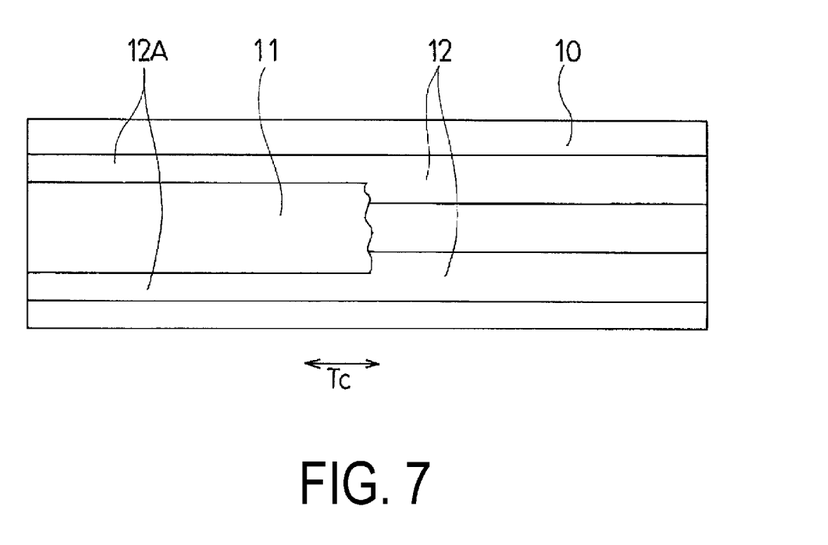
FIG. 7 is a developed view illustrating a modified example of the sound absorbing member and heat transfer member bonded to the inner surface of the pneumatic tire according to the present technology.

FIGS. 6 and 7 illustrate a modified example of sound absorbing member and heat transfer member bonded to the inner surface of the pneumatic tire according to the present technology. In the embodiment illustrated in FIGS. 4 and 5, the heat transfer member 12 extends over the whole region in the width direction of the sound absorbing member 11. However, in the embodiment illustrated in FIGS. 6 and 7, the heat transfer member 12 is not present over a portion of the region in which the sound absorbing member 11 is bonded, and the area where the heat transfer member 12 is not present is filled with the adhesive layer 13. Note that preferably, the heat dissipation part 12A is provided on both sides in the width direction of the heat transfer member 12. However, the heat dissipation part 12A may be provided only on one side in the width direction of the heat transfer member 12.

In the pneumatic tire described above, the sound absorbing member 11 extends along the tire circumferential direction, but a length L in the tire width direction of each of the heat dissipation parts 12A of the heat transfer member 12 may be in the range from 5% to 50% of a width W of the sound absorbing member 11. This configuration allows the heat transferred to the heat transfer member 12 in the region below the sound absorbing member 11 to be effectively dissipated via the heat dissipation part 12A. When the length L of the heat dissipation part 12A is less than 5% of the width W of the sound absorbing member 11, the heat dissipation effect is reduced. Conversely, even when the length L exceeds 50% of the width W, a greater heat dissipation effect cannot be expected, and merely produces strain more easily in the heat dissipation part 12A.

In the pneumatic tire described above, preferably the heat transfer member includes a heat conductive material with a thermal conductivity of not less than 10 W/(m·K), and more preferably from 50 W/(m·K) to 500 W/(m·K). The thermal conductivity of normal rubber is from 0.1 W/(m·K) to 0.2 W/(m·K), and the thermal conductivity of polyurethane foam is about 0.015 W/(m·K). Thus, the inclusion of the heat conductive material having such a thermal conductivity in the heat transfer member 12 can provide a good heat dissipation effect. Also, preferably a thermal conductivity of the entire heat transfer member 12 is not less than 0.2 W/(m·K). The thermal conductivity is obtained as per ASTM E 1530 standard.

Figure 8:
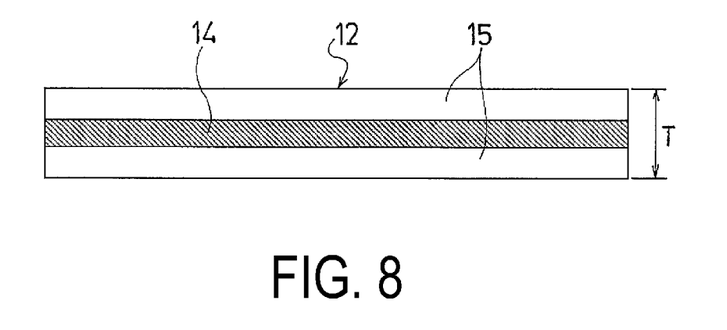
FIG. 8 is a cross-sectional view illustrating an example of the heat transfer member used in the present technology.

FIG. 8 illustrates an example of the heat transfer member used in the present technology. In FIG. 8, the heat transfer member 12 is a laminate that includes metal foil 14, and a pair of resin layers 15 laminated on both sides of the metal foil 14. The metal foil 14 is preferably aluminum foil. Also, the laminate of the metal foil 14 and the resin layers 15 may have a thermal diffusivity at 100° C. of not less than $0.2 \times 10^{-7}$ m$^2$/s, or more preferably not less than $0.5 \times 10^{-7}$ m$^2$/s. On the other hand, the resin layers 15 may be mainly composed of polypropylene or polyester. The metal foil 14 has an excellent thermal conductivity, but the metal foil 14, when singly used, may rupture or peel as a result of the tire traveling. In contrast, with the heat transfer member 12 composed of a laminate of the metal foil 14 and the resin layers 15, the adhesion of the heat transfer member 12 can be improved due to the resin layers 15 having excellent adhesion, and rupture of the metal foil 14 can be prevented while a good thermal conductivity is maintained.

Figure 9:
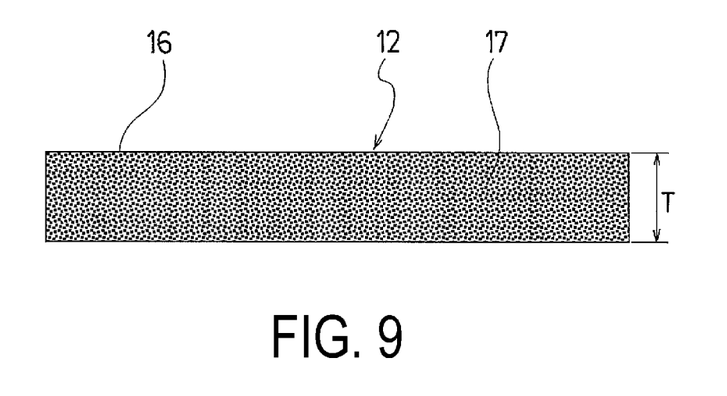
FIG. 9 is a cross-sectional view illustrating another example of the heat transfer member used in the present technology.

FIG. 9 illustrates another example of heat transfer member used in the present technology. In FIG. 9, the heat transfer member 12 is composed of a matrix 16 and a powder 17 of a heat conductive material dispersed in the matrix 16. The matrix 16 can be composed of a resin or rubber compound. There is no particular limitation on the heat conductive material of which the powder 17 is composed. Such a heat transfer member 12 composed of the matrix 16 and the powder 17 of a heat conductive material dispersed in the matrix 16 also exhibits a good heat dissipation effect.

Note that the adhesive layer 13 is interposed between the tire inner surface 10 and the heat conductive member 12. Thus, in order to ensure heat conductivity from the tire inner surface 10 to the heat transfer member 12, it is preferable that the thermal conductivity of the adhesive layer 13 be set to be not less than 0.2 W/(m·K), preferably not less than 0.3 W/(m·K), and more preferably not less than 0.5 W/(m·K).

A thickness T of the heat transfer member 12 (see FIGS. 8 and 9) may be from 30 μm to 150 μm. This allows the heat transfer member 12 to secure heat dissipation and durability. When the thickness T of the heat transfer member 12 is less than 30 μm, the heat dissipation is reduced; conversely, when the thickness T is greater than 150 μm, the durability with respect to out-of-plane bending stress is reduced.

Figure 10:
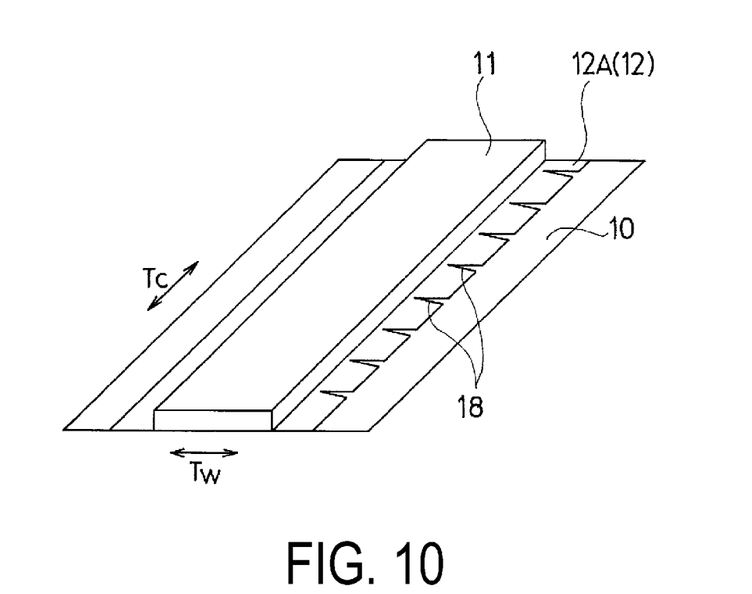
FIG. 10 is a perspective view illustrating another modified example of the sound absorbing member and heat transfer member bonded to the inner surface of the pneumatic tire according to the present technology.

FIG. 10 illustrates another modified example of sound absorbing member and heat transfer member bonded to the inner surface of the pneumatic tire according to the present technology. In FIG. 10, the heat transfer member 12 has a plurality of cuts 18 at least at an end of the heat dissipation part 12A. When the cuts 18 are provided at the end of the heat dissipation part 12A of the heat transfer member 12 as described above, the heat transfer member 12 can easily follow the deformation of the tire, which can improve the adhesion of the heat transfer member 12 to the tire inner surface 10. Note that, when the cuts 18 are created, the cuts 18 may be formed over the whole region in the width direction of the heat transfer member 12, which causes the heat transfer member 12 to be divided in the tire circumferential direction.

Figure 11:
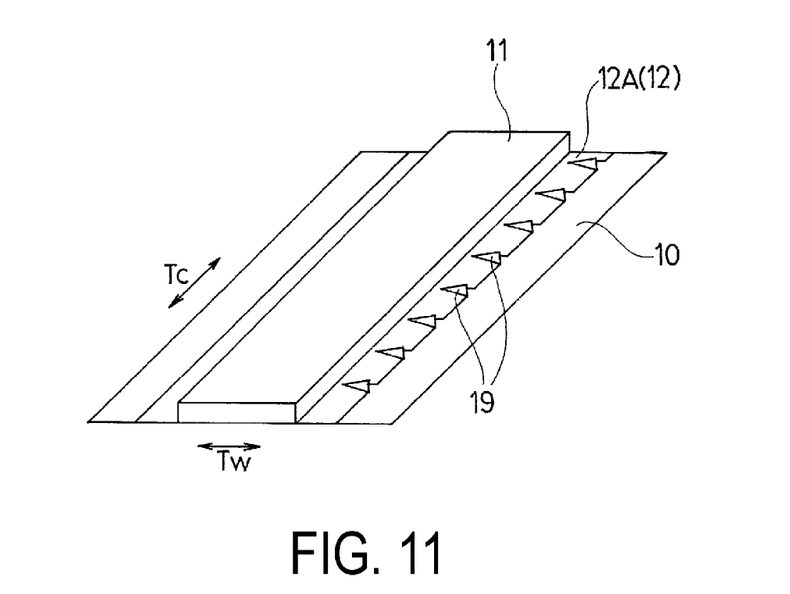
FIG. 11 is a perspective view illustrating another modified example of the sound absorbing member and heat transfer member bonded to the inner surface of the pneumatic tire according to the present technology.

FIG. 11 illustrates another modified example of sound absorbing member and heat transfer member bonded to the inner surface of the pneumatic tire according to the present technology. In FIG. 11, the heat transfer member 12 has a three-dimensional structure at least at an end of the heat dissipation part 12A. In other words, three-dimensional heat dissipation parts 19 are formed in the heat dissipation part 12A, the three-dimensional heat dissipation parts 19 being formed of a plurality of fins that result from machining of the cuts into a folded shape. The heat dissipation part 12A of the heat transfer member 12 having a three-dimensional structure as described above can further increase the heat dissipation effect therefrom. Note that, in order to form the three-dimensional structure, an end of the heat dissipation part 12A may be stretched in the tire circumferential direction to form wrinkles in the heat dissipation part 12A.

Figure 12:
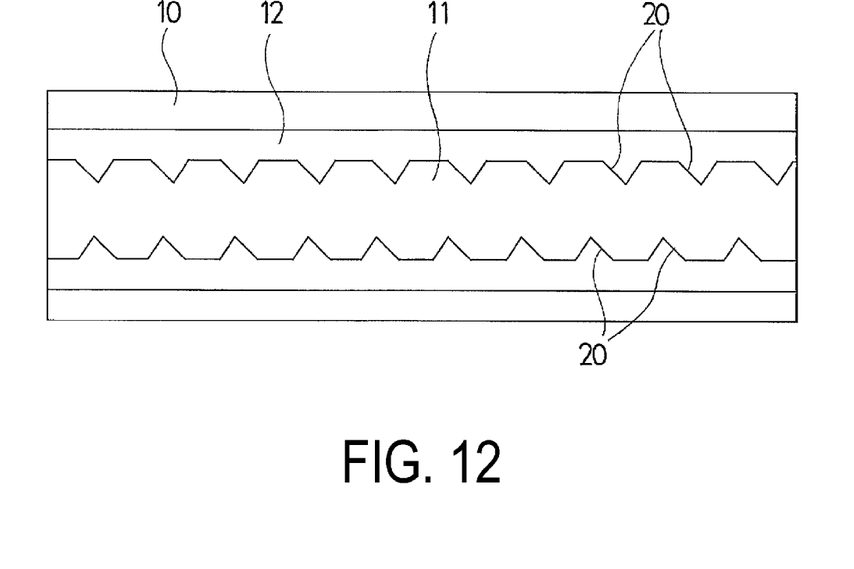
FIG. 12 is a developed view illustrating another modified example of the sound absorbing member and heat transfer member bonded to the inner surface of the pneumatic tire according to the present technology.

FIG. 12 illustrates another modified example of sound absorbing member and heat transfer member bonded to the inner surface of the pneumatic tire according to the present technology. In FIG. 12, the sound absorbing member 11 has a plurality of notches 20 in a region directly above the heat transfer member 12. As a result, the heat transfer member 12 is exposed at the locations corresponding to the notches 20. The sound absorbing member 11 having the notches 20 in the region directly above the heat transfer member 12 as described above can further increase the heat dissipation effect of the heat transfer member 12, without substantially reducing the sound absorbing effect of the sound absorbing member 11, compared with reducing the width of the sound absorbing member 11.

Figure 13:
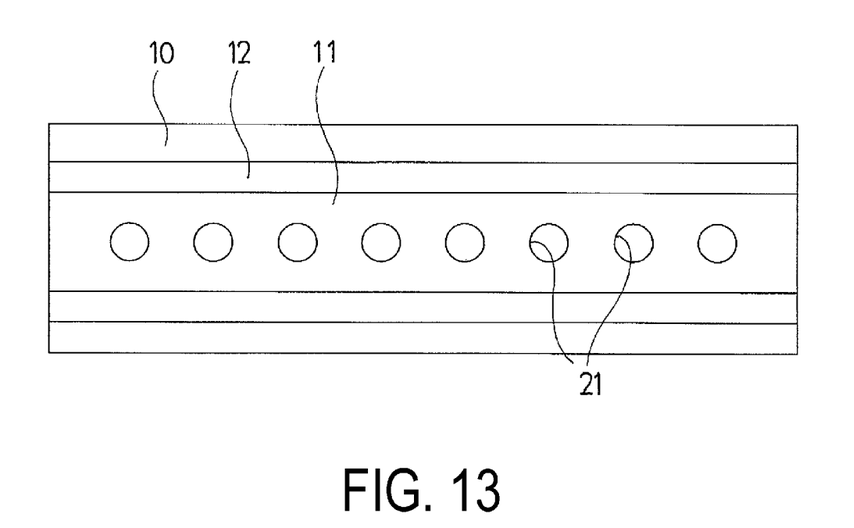
FIG. 13 is a developed view illustrating another modified example of the sound absorbing member and heat transfer member bonded to the inner surface of the pneumatic tire according to the present technology.

FIG. 13 illustrates another modified example of sound absorbing member and heat transfer member bonded to the inner surface of the pneumatic tire according to the present technology. In FIG. 13, a plurality of through holes 21 are provided through the sound absorbing member 11 in a region directly above the heat transfer member 12. As a result, the heat transfer member 12 is exposed at locations corresponding to the through holes 21. The through holes 21 provided through the sound absorbing member 11 in the region directly above the heat transfer member 12 as described above can increase the heat dissipation effect of the heat transfer member 12, without substantially reducing the sound absorbing effect of the sound absorbing member 11, compared with reducing the width of the sound absorbing member 11.

EXAMPLES

Tires of Examples 1 to 8 having tire size of 275/35R20 were manufactured. The tires each includes an annular tread portion extending in the tire circumferential direction, a pair of sidewall portions disposed on both sides of the tread portion, a pair of bead portions disposed on the inner sides in the tire radial direction of the sidewall portions, and a sound absorbing member bonded to the tire inner surface in the region corresponding to the tread portion along the tire circumferential direction. The sheet-like heat transfer member was provided between the tire inner surface and the sound absorbing member to extend outward from the region where the sound absorbing member was bonded, which forms a heat dissipation part, projecting from the sound absorbing member, in the heat transfer member. The ratio of the length L of the heat dissipation part to the width W of the sound absorbing member, the thickness of the heat transfer member T, and the structures of the sound absorbing member and the heat transfer member (FIG. 3, FIG. 10, FIG. 11, FIG. 12, or FIG. 13) were set as shown in Table 1.

In Examples 1 to 8, a laminate of metal foil (aluminum foil) and resin layers (polypropylene), having a thermal conductivity of 160 W/(m·K), was used as the heat transfer member.

Also, for comparison, a tire of Conventional Example was manufactured, the tire having the same structure as Examples 1 to 8 except that no heat transfer member was provided.

The high-speed durability of the tires of Conventional Example and Examples 1 to 8 was evaluated. In the evaluation of high-speed durability, each test tire was assembled onto a wheel of rim size 20×9.5 J, and traveling tests were carried out in a drum testing machine under the conditions of air pressure of 220 kPa, load of 6.6 kN, and initial speed of 150 km/h. Every 10 minutes, the speed was increased by 5 km/h, and the speed at which a failure occurred in the tread portion was checked. The results are shown in Table 1.

TABLE 1

|  | Conventional Example | Example 1 | Example 2 | Example 3 | Example 4 |
|---|---|---|---|---|---|
| Presence or absence of heat transfer member | Absence | Presence | Presence | Presence | Presence |
| Length ratio of heat dissipation part (L/W × 100%) | N/A | 2 | 10 | 30 | 10 |
| Thickness of heat transfer member T (μm) | N/A | 80 | 80 | 80 | 120 |
| Structure of sound absorbing member and heat transfer member | N/A | FIG. 3 | FIG. 3 | FIG. 3 | FIG. 3 |
| High-speed durability | 330 km/h | 335 km/h | 345 km/h | 350 km/h | 345 km/h |

|  | Example 5 | Example 6 | Example 7 | Example 8 |
|---|---|---|---|---|
| Presence or absence of heat transfer member | Presence | Presence | Presence | Presence |
| Length ratio of heat dissipation part (L/W × 100%) | 10 | 10 | 10 | 10 |
| Thickness of heat transfer member T (μm) | 80 | 80 | 80 | 80 |
| Structure of sound absorbing member and heat transfer member | FIG. 10 | FIG. 11 | FIG. 12 | FIG. 13 |
| High-speed durability | 350 km/h | 355 km/h | 355 km/h | 355 km/h |

As shown in Table 1, it was possible to improve the high-speed durability of the tires of Examples 1 to 8 compared with Conventional Example in which the sound absorbing member was bonded to the tire inner surface without the heat transfer member interposed therebetween.

The invention claimed is:

1. A pneumatic tire, comprising:
    an annular tread portion extending in a tire circumferential direction;
    a pair of sidewall portions disposed on both sides of the tread portion;
    a pair of bead portions disposed on inner sides in a tire radial direction of the sidewall portions;
    a sound absorbing member bonded to a tire inner surface; and
    a sheet-like heat transfer member disposed between the tire inner surface and the sound absorbing member to extend outward from a region where the sound absorbing member is bonded, a heat dissipation part projecting from the sound absorbing member being formed in the heat transfer member, and the heat transfer member being a laminate of metal foil and a resin layer;

wherein the sound absorbing member and the sheet-like heat transfer member are disposed only at the tread portion without extending to the sidewall portions.

2. The pneumatic tire according to claim 1, wherein
the sound absorbing member extends along the tire circumferential direction, and
a length in a tire width direction of each heat dissipation part of the heat transfer member is from 5% to 50% of a width of the sound absorbing member.

3. The pneumatic tire according to claim 2, wherein the heat transfer member includes a heat conductive material with a thermal conductivity of not less than 10 W/(m·K).

4. The pneumatic tire according to claim 3, wherein a thickness of the heat transfer member is from 30 μm to 150 μm.

5. The pneumatic tire according to claim 4, wherein the heat transfer member has a cut provided at least at an end of the heat dissipation part.

6. The pneumatic tire according to claim 5, wherein the heat transfer member has a three-dimensional structure at least at an end of the heat dissipation part.

7. The pneumatic tire according to claim 6, wherein the sound absorbing member has a through hole or a notch in a region directly above the heat transfer member.

8. The pneumatic tire according to claim 1, wherein the heat transfer member includes a heat conductive material with a thermal conductivity of not less than 10 W/(m·K).

9. The pneumatic tire according to claim 1, wherein a thickness of the heat transfer member is from 30 μm to 150 μm.

10. The pneumatic tire according to claim 1, wherein the heat transfer member has a cut provided at least at an end of the heat dissipation part.

11. The pneumatic tire according to claim 1, wherein the heat transfer member has a three-dimensional structure at least at an end of the heat dissipation part.

12. The pneumatic tire according to claim 1, wherein the sound absorbing member has a through hole or a notch in a region directly above the heat transfer member.

13. The pneumatic tire according to claim 1, wherein the heat transfer member is divided in a tire width direction.

14. The pneumatic tire according to claim 13, wherein the sound absorbing member is bonded directly to the tire inner surface by an adhesive layer at a bonded region positioned between portions of the heat transfer member divided in the tire width direction, and the heat transfer member is not disposed between the tire inner surface and the sound absorbing member at the bonded region.

15. The pneumatic tire according to claim 1, wherein:
the heat transfer member has a cut provided at least at an end of the heat dissipation part; and
the heat transfer member has a three-dimensional structure at least at the end of the heat dissipation part formed by folding at the cut to form a fin.

16. The pneumatic tire according to claim 1, wherein the sound absorbing member has a through hole or a notch in a region directly above the heat transfer member and which extends straight through the sound absorbing member to the heat transfer member.

17. The pneumatic tire according to claim 1, wherein the sound absorbing member is bonded directly to the heat transfer member by a first adhesive layer and the heat transfer member is bonded directly to the tire inner surface by a second adhesive layer.

18. The pneumatic tire according to claim 1, wherein the sound absorbing member is bonded directly to the tire inner surface by an adhesive layer at a bonded region and the heat transfer member is not disposed between the tire inner surface and the sound absorbing member at the bonded region.

* * * * *